United States Patent [19]

Kriek et al.

[11] Patent Number: 4,732,922

[45] Date of Patent: Mar. 22, 1988

[54] FLAME RETARDANT POLYETHYLENE TEREPHTHALATE COMPOSITIONS

[75] Inventors: George R. Kriek, Bethel Park; Mark W. Witman, Pittsburgh, both of Pa.

[73] Assignee: Mobay Corporation, Pittsburgh, Pa.

[21] Appl. No.: 19,097

[22] Filed: Feb. 26, 1987

Related U.S. Application Data

[63] Continuation-in-part of Ser. No. 873,244, Jun. 11, 1986, abandoned.

[51] Int. Cl.$^4$ .......................... C08K 5/34; C08L 67/02
[52] U.S. Cl. ........................................ 524/94; 524/412; 524/513
[58] Field of Search .................... 524/513, 94, 412

[56] References Cited

U.S. PATENT DOCUMENTS

| | | | | |
|---|---|---|---|---|
| 3,642,728 | 2/1972 | Canter | ................................. | 260/79.3 |
| 4,147,677 | 4/1979 | Lundberg | ........................... | 260/23.5 |
| 4,188,351 | 2/1980 | Chung | ................................. | 260/33.6 |
| 4,330,447 | 5/1982 | Lundberg | ........................... | 524/269 |
| 4,407,998 | 10/1983 | Duvdevani | ........................ | 524/229 |

OTHER PUBLICATIONS

Chemical Abstract, Advances in Chemistry, Series 1980 187, (Ions Polym.), pp. 3-19.

*Primary Examiner*—Lewis T. Jacobs
*Attorney, Agent, or Firm*—Gene Harsh; Joseph C. Gil; Aron Preis

[57] ABSTRACT

Flame resistant, reinforced thermoplastic molding compositions based on polyethylene terephthalate resins were found to have a lowered tendency to drip during burning upon the addition thereto of a sufficient amount of a particular ionic elastomer. The addition of the drip suppressant in accordance with the invention does not compromise the physical and mechanical properties of the composition.

4 Claims, No Drawings

FLAME RETARDANT POLYETHYLENE TEREPHTHALATE COMPOSITIONS

This application is a continuation-in-part of pending application Ser. No. 873,244, filed June 11, 1986, now abandoned.

FIELD OF THE INVENTION

The invention is directed to a thermoplastic molding composition and more particularly to flame resistant polyethylene terephthalate based compositions.

SUMMARY OF THE INVENTION

Flame resistant, reinforced thermoplastic molding compositions based on polyethylene terephthalate resins were found to have a lowered tendency to drip during burning upon the addition thereof of a sufficient amount of a particularly ionic elastomer. The addition of the drip suppressant in accordance with the invention does not compromise the physical and mechanical properties of the composition.

BACKGROUND OF THE INVENTION

EPDM rubbers (ethylene/propylene/diene mixtures) and their sulfonated versions are well known in the art, see U.S. Pat. No. 3,836,511. Neutralized sulfonated EPDM rubbers are disclosed in U.S. Pat. No. 4,147,677 to be mixed with plastics and to be molded into articles having good properties. U.S. Pat. No. 3,642,728 discloses selective sulfonation of sites of olefinic unsaturation in EPDM. The sulfonic acid containing polymers and their sulfonate salts are said to exhibit improved physical properties as compared to their unsulfonated counterparts. Also disclosed in this patent are methods for making ionomers such as by neutralizing the acidic polymers, for instance, by using a metal compound in a solubilized form and adding it to the solution of the acidic polymer with good mixing. The patent also discloses that a sulfonated EPDM is suitable for blending with a variety of resins including polyethylene terephthalate.

U.S. Pat. No. 4,188,351 discloses elastomeric blends, containing neutralized sulfonated elastomeric polymer and polystyrene thermoplastic resin, having improved rheological properties.

U.S. Pat. No. 4,330,447 discloses compositions containing neutralized sulfonated polymer, characterized in having an improved melt flow and a lower coefficient of friction.

In accordance with the Chemical Abstract of Adv. Chem. Ser. 1980, 187 (Ions Polym.), 3-19 (Eng) metal sulfonated groups were introduced in EPDM rubbers by reaction of the residual unsaturation with acetyl sulfate followed by neutralization of the resultant polymeric sulfonic acid with metal acetate. By proper selection of the EPDM backbone and sulfonate content and through the use of a zinc cation it was possible to prepare EPDM based ionomers with excellent mechanical properties and low melt viscosities.

The physical properties of blends of polypropylene with sulfonated EPDM rubber zinc salts were disclosed in European patent application No. EP-56003.

DESCRIPTION OF THE INVENTION

The invention is directed to thermoplastic molding compositions comprising a polyethylene terephthalate resin, flame retarding agents, a reinforcing amount of a reinforcing filler and a metal salt of sulfonated EPDM in amount sufficient to render the composition non-dripping when tested in accordance with UL-94 V at 1/32 ". In a preferred embodiment, the amount of reinforcing filler is 5 to 50%, more preferably 15 to 40%, in relation to the weight of the resin plus flame retarding agent. In a further preferred embodiment, the amount of the metal salt of the sulfonated EPDM is between 1.5 and 8%, more preferably between 2 and 5% in relation to the weight of the resin plus flame retarding agent. Polyethylene terephthalate resin generally rates V-2 in accordance with UL-94 and even on incorporation of a significant amount of conventional flame retarding agents the rating is about V-2 (1/16"). The present invention resides in the improved flammability rating expressed as little or no dripping when evaluated in accordance with UL-94 V at 1/32" which is imparted to reinforced compositions containing flame retardant PET upon the incorporation of a metal salt of sulfonated EPDM—an ionomer—therewith.

The polyethylene terephthalate resin entailed in the present invention is known and is readily available in commerce. The resin has an intrinsic viscosity of at least 0.3 deciliters per gram measured as a 0.5% solution in a 1:1 mixture of phenol and tetrachloroethane at 25° C. Preferably the intrinsic viscosity ranges from about 0.4 to about 1.0 deciliter per gram. The polyethylene terephthalate resin may contain minor amounts of other comonomers such as diethylene glycol or isophthalic acid in substitution for the ethylene glycol or terephthalic acid respectively.

The flame retarding agents entailed in the compositions of the invention are well known in the art. The more important of these agents contain bromine, chlorine, antimony, phosphorus or nitrogen. Among the preferred flame retarding agents mention may be made of halogenated organic compounds (brominated or chlorinated), a halogen containing organic compound in mixture with antimony oxide, elemental phosphorus or a phosphorus compound, a halogen containing compound in admixture with a phosphorus compound or compounds containing phosphorus-nitrogen bonds or a mixture of two or more of the foregoing. The amount of flame retardant agent used in the present composition is that which is sufficient to impart to the reinforced polyethylene terephthalate a flame retarding rating of V-2 at 1/16" in accordance with UL-94. Advantageously the amount of the flame retarding agent is from 0.5 to 50 preferably 3 to 25, most preferably 5 to 15 parts by weight per 100 parts of resin. Examples of flame retarding agents for polyethylene terephthalates suitable in the context of the present invention are disclosed in U.S. Pat. No. 4,013,613 and in the Chemistry and Uses of Fire Retardants, J. W. Lyons, Wiley-Interscience, 1970, both of which documents are incorporated herein by reference.

The compositions of the invention contain a reinforcing amount of a reinforcing filler. In general any reinforcing agent can be used such as fibers, whiskers or platelets of metals (for instance aluminum, iron or nickel) or non-metals (for instance carbon filaments, silicates, asbestos, titanium dioxide, titanate whiskers, glass flakes and glass fibers). Unless the filler adds to the strength, stiffness or impact strength of the composition it is only a filler and not a reinforcing filler that is contemplated in the present context. The amount of the reinforcing filler is advantageously between 5 and 50%, preferably between 15 and 40% relative to the weight of the resin plus flame retarding agent.

Particularly preferred reinforcing fillers are glass fibers and among these it is preferred to use glass filaments which are relatively sodium free ("E" Glass). Other glasses which are useful include low-sodium glass, "C" Glass. It is preferred to use the glass fibers in the form of chopped strands having a length of about ⅛" to about 1" preferably less than ¼" long.

The salts of the sulfonated EPDM rubbers—ionomers—of the present invention are known in the art and are commercially available. IE 1025 and IE 2590 are such ionomers and are commercial products of Uniroyal Corporation. Essentially the EPDM rubbers contain ethylene and propylene in the backbone and a diene in the side chain. These terpolymers have been described in ASTM-D1418-64 and a method for their preparation has been taught in U.S. Pat. No. 3,280,082, British patent No. 1,030,289 and French patent No. 1,386,600 all of which documents are incorporated herein by reference. Preferably the polymers contain about 40 to 90 weight percent ethylene, about 1 to 10 weight percent of a diene monomer the balance of the polymer being propylene. Preferably the polymer contains about 45 to about 80 weight percent ethylene and about 2.6 to about 8.0 weight percent diene monomer. The diene monomer is preferably a non-conjugated diene. Illustrative non-conjugated diene monomers which may be used in the terpolymer are hexadiene, dicyclopentadiene, ethylidene norbornene, methylidene norbornene, propylidene norbornene and methyltetrahydroindene. The EPDM terpolymer has a number average molecular weight, as measured by GPC, of about 10,000 to 200,000 more preferably about 15,000 to about 100,000 most preferably from about 20,000 to about 50,000.

Before becoming suitable for the purposes of the present invention the EPDM rubber is sulfonated and neutralized following a procedure which is well known and disclosed in the art, for instance in U.S. Pat. No. 4,330,447 the disclosure of which is incorporated herein by reference. Also, the suitable metal salts for the neutralization of the sulfonated EPDM rubbers of the invention have been disclosed in U.S. Pat. No. 4,310,445 which disclosure is incorporated herein by reference. Also incorporated herein by reference are U.S. Pat. Nos. 3,836,511 and 3,642,728 which disclose a process for sulfonating and neutralizing of EPDM rubbers. The counter-ions (cations) suitable in neutralizing the sulfonated EPDM rubbers, for the purpose of preparing the ionomers of the invention are preferably mono-, di-, tri- and tetra-valent metals in Groups I, II, III, IV, VI, VI-B, VII-B and VIII of the Periodic Table of the Elements. (See page B-3, Handbook of Chemistry and Physics, Chemical Rubber Publishing Company, 47th Edition). Among the suitable metal ions are $Na^+$, $K^+$, $Li^+$, $Cs^+$, $Ag^+$, $Hg^+$ and $Cu^+$. Also $Be^{+2}$, $Mg^{+2}$, $Ca^{+2H}$, $Hg^{+2}$, $Sr^{+2}$, $Ba^{+2}$, $Cu^{+2}$, $Cd^{+2}$, $Sn^{+2}$, $Fe^{+2}$, $Pb^{+2}$, $Co^{+2}$, $Ni^{+2}$ and $Zn^{+2}$. Also $Al^{+3}$, $Fe^{+3}$, $Y^{+3}$ and $Sn^{+4}$, $Ti^{+4}$ and $Pb^{+4}$.

Exemplifying the ionomers which are the metal salts of the sulfonated EPDM rubbers of the invention are the commercial products, IE 1025 and IE 2590 which are available from Uniroyal. In general the molecular weight of these ionomers is about 50,000 the neutralizing counter-ion in these ionomers is zinc. The bulk density of these ionomers is about 8 to 10 pounds per cubic foot and the glass transition temperature is about −60° C. They differ one from the other in that IE 1025 contains about 5 and IE 2590 contains about 13 $SO_3^-$ groups per molecule.

The "Test for Flammability of Plastic Materials-UL-94 V" is a well known standard and is widely used in the industry. In evaluating the compositions of the invention a procedure substantially similar to UL-94 V was followed and summarized below:

i. apply a ¾" flame to the bottom of the test bar for 10 seconds,
ii. remove the flame, note the length of time during which the bar continues to burn,
iii. if the bar does not burn or when the flame goes out, immediately reapply the flame for 10 seconds,
iv. remove the flame and note whether the bar burns or drips,
v. continue reapplying the flame if condition (iii) is met, for a total of 5 flame applications or until the bar drips, whichever is first.

The advantage of the composition of the invention is the attainment of virtual total drip suppression for specimens 1/32" in thickness in accordance with UL-94. This is a distinct and surprising improvement over the performance of flame retardant PET which typically fails this test.

The invention is further illustrated, but is not intended to be limited by the following examples in which all parts and percentages are by weight unless otherwise specified.

EXAMPLES

Examples 1–10

The ionomers used in the examples were IE 1025 from Uniroyal. While both IE 1025 and IE 2590 are effective in the context of the present invention IE 1025 represents a preferred embodiment since the level of the mechanical properties of the composition where it is incorporated is better maintained than in compositions containing IE 2590. Moreover the compositions containing IE 1025 are more easily processed. The results tabulated below show that by increasing the amount of added ionomer there results an improvement in the drip suppression. An addition of ionomer at levels much higher than 5% bring about a decline in the level of the mechanical properties.

In preparing the compositions, the PET resin (Tenite 7741 from Eastman Kodak) was compounded with glass fibers and a flame retardant agent which was a mixture of 1,2-bis-(tetrabromophthalimide)ethane and antimony oxide. In addition the compositions contained an epoxide, an auxiliary hydrolysis stabilizer and a thermal stabilizer none being critical to the present invention. The compounding and molding of the composition followed procedures known in the art for PET processing. While not critical to the present invention the added epoxide was found to result in the recoupment of the loss in the mechanical properties associated with the addition of the ionomer. Epoxide in an amount of 0.2 to about 1% in relation to the weight of the PET resin may advantageously be added.

TABLE

| | 1 | 2 | 3 | 4 | 5 | 6 | 7 | 8 | 9 | 10 |
|---|---|---|---|---|---|---|---|---|---|---|
| PET | 55.3 | 54.8 | 54.3 | 53.8 | 53.3 | 52.8 | 52.3 | 51.8 | 51.3 | 52.8 |

TABLE-continued

|  | 1 | 2 | 3 | 4 | 5 | 6 | 7 | 8 | 9 | 10 |
|---|---|---|---|---|---|---|---|---|---|---|
| Glass Fibers | 30.0 | 30.0 | 30.0 | 30.0 | 30.0 | 30.0 | 30.0 | 30.0 | 30.0 | 30.0 |
| Flame retarding[1] agent | 14.0 | 14.0 | 14.0 | 14.0 | 14.0 | 14.0 | 14.0 | 14.0 | 14.0 | 14.0 |
| Auxiliary Additives | 0.7 | 0.7 | 0.7 | 0.7 | 0.7 | 0.7 | 0.7 | 0.7 | 0.7 | 0.7 |
| Ionomer[4] | — | 0.5 | 1.0 | 1.5 | 2.0 | 2.5 | 3.0 | 3.5 | 4.0 | 2.5[3] |
| Flammability, 1/16" Modified UL 94 Test[2] | 4 | 5 | 5 | 2 | 3 | 2 | 3 | 0 | 0 | 4 |
| Impact strength Izod, notched (J/m) | 78.7 | 75.6 | 89.9 | 81.1 | 77.5 | 78.8 | 80.2 | 81.9 | 76.7 | 76.3 |
| Unnotched (J/m) | 950 | 841 | 881 | 1001 | 847 | 966 | 955 | 936 | 913 | 941 |
| Flexural Strength (MPa) | 230 | 234 | 235 | 242 | 230 | 234 | 224 | 215 | 218 | 235 |
| Flexural Modulus (GPa) | 12.0 | 11.8 | 11.8 | 11.1 | 11.8 | 11.5 | 10.8 | 10.7 | 10.7 | 11.1 |
| Tensile Strength (MPa) | 154 | 157 | 154 | 153 | 156 | 152 | 149 | 146 | 144 | 158 |

[1] A mixture of 1,2-bis-(tetrabromophthalimide)ethane and antimony oxide.
[2] The number of test bars which dripped out of 5 bars which were tested.
[3] An unmodified EPDM terpolymer.
[4] IE 1025.

Examples 11-12

Further compositions in accordance with the invention were prepared and their properties determined as summarized below. The components and preparations were similar to the ones above.

|  | 11 | 12 |
|---|---|---|
| PET | 55.3 | 52.8 |
| Glass Fibers | 30.0 | 30.0 |
| Flame Retarding Agents[1] | 14.0 | 14.0 |
| Auxiliary Additives | 0.7 | 0.7 |
| Ionomers[4] | — | 2.5 |
| Flammability Testing per UL-94V 1/32" | 4[3] | 0[2] |

[1] 3.5% of Sb$_2$O$_3$ and 10.5% of 1,2-bis-(tetrabromo-phthalimide)ethane.
[2] Ten test bars tested - number of bars that dripped.
[3] Four test bars tested - number of bars that dripped.
[4] IE 1025.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reinforced thermoplastic molding composition comprising:
    a flame retarded polyethylene terephthalate resin having an intrinsic viscosity of at least 0.3 deciliters per gram measured as a 0.5% by weight solution in a 1:1 mixture of phenol and tetrachloroethane at 25° C. and containing at least a sufficient amount of a flame retardant agent to display a flammability rating of V2 at 1/16" in accordance with UL-94,
    (b) between about 5 and about 50 weight percent of a reinforcing filler, and
    (c) between 1.5 and 5 weight percent of a metal salt of a sulfonated EPDM rubber,
    said weight percent of said (b) and said weight percent of (c) being in relation to the weight of said (a).

2. The composition of claim 1 wherein said reinforcing filler is glass fibers.

3. The composition of claim 2 wherein said flame retarding agent is a mixture of antimony oxide and 1,2-bis-(tetrabromophthalimide)ethane.

4. The composition of claim 3 wherein the metal of said salt is zinc.

* * * * *